United States Patent
Nagaoka et al.

(10) Patent No.: US 6,459,835 B1
(45) Date of Patent: Oct. 1, 2002

(54) OPTICAL CONNECTOR

(75) Inventors: Yasutaka Nagaoka; Nobuhiko Suzuki; Hiroyuki Kondo; Norihito Suzuki; Junichi Matsushita, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/537,436

(22) Filed: Mar. 27, 2000

(30) Foreign Application Priority Data

Apr. 23, 1999 (JP) ............................................ 11-115787

(51) Int. Cl.[7] ................................................. G02B 6/26
(52) U.S. Cl. ............................... 385/43; 385/33; 385/88; 385/98; 385/92
(58) Field of Search ............................ 385/43, 33, 93, 385/92, 38, 88, 98

(56) References Cited

U.S. PATENT DOCUMENTS 5,647,041 A  7/1997  Presby ......................... 385/43
5,852,692 A  * 12/1998  Nightingale et al. .......... 385/43
6,062,742 A  * 5/2000  Yuuki ............................ 385/43
6,094,517 A  * 7/2000  Yuuki ............................ 385/43

FOREIGN PATENT DOCUMENTS

| EP | 0 021 352 | 1/1981 |
| GB | 1 413 425 | 11/1975 |
| JP | 6-33443 | 8/1994 |

* cited by examiner

*Primary Examiner*—Cassandra Spyrou
*Assistant Examiner*—Fayez Assaf
(74) *Attorney, Agent, or Firm*—Armstrong, Westerman & Hattori, LLP.

(57) ABSTRACT

In an optical connector, a sleeve is located between an optical fiber 6 and a light receiving/transmitting module 4 and makes an optical connection therebetween. The sleeve has a light guiding passage which is tapered from the optical fiber toward the light receiving/transmitting module, thereby forming a conical shape with its sloped side wall. The end face having a reduced diameter of the light-guiding passage 26 thus formed is arranged oppositely to the light receiving/transmitting module.

9 Claims, 14 Drawing Sheets

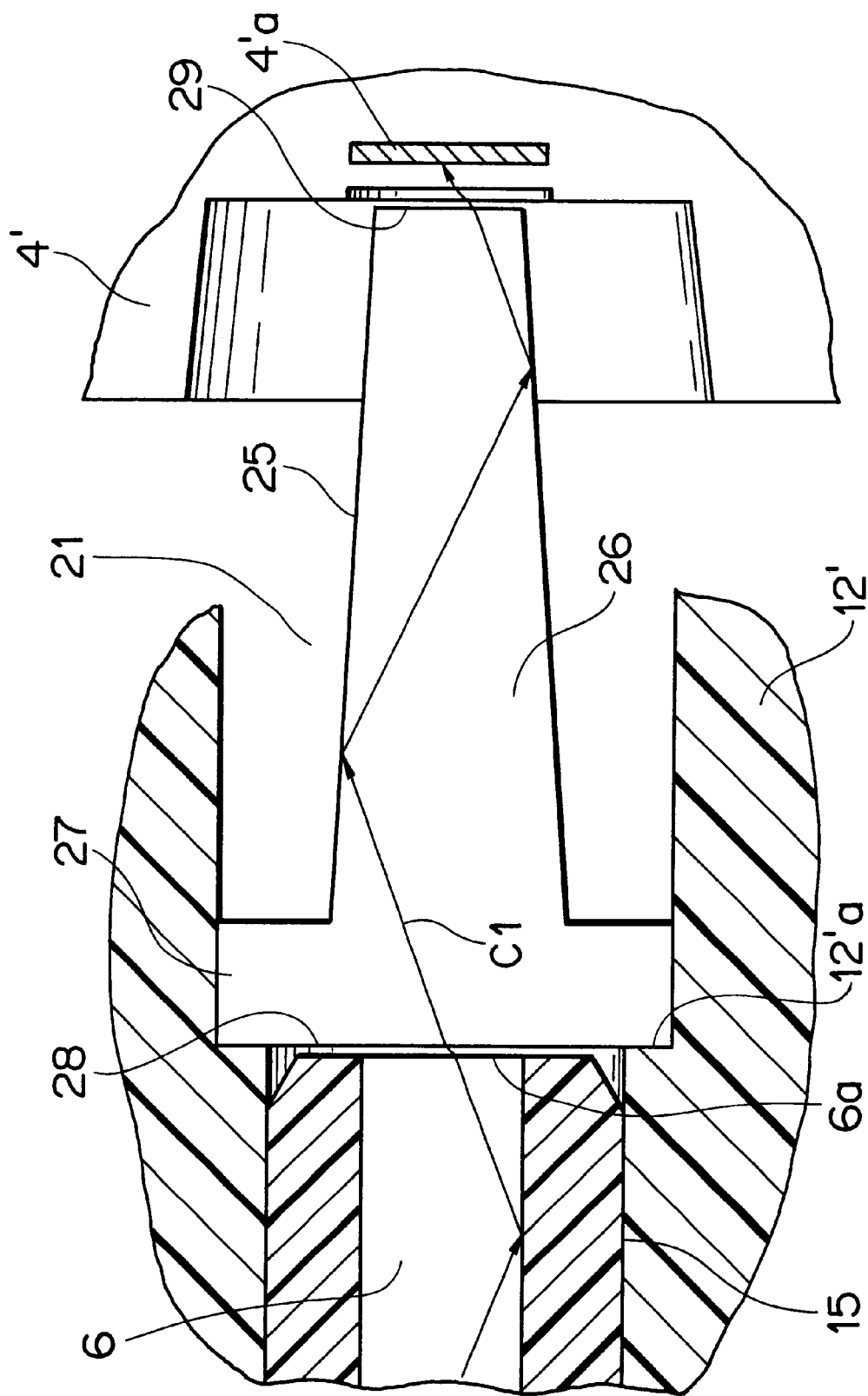

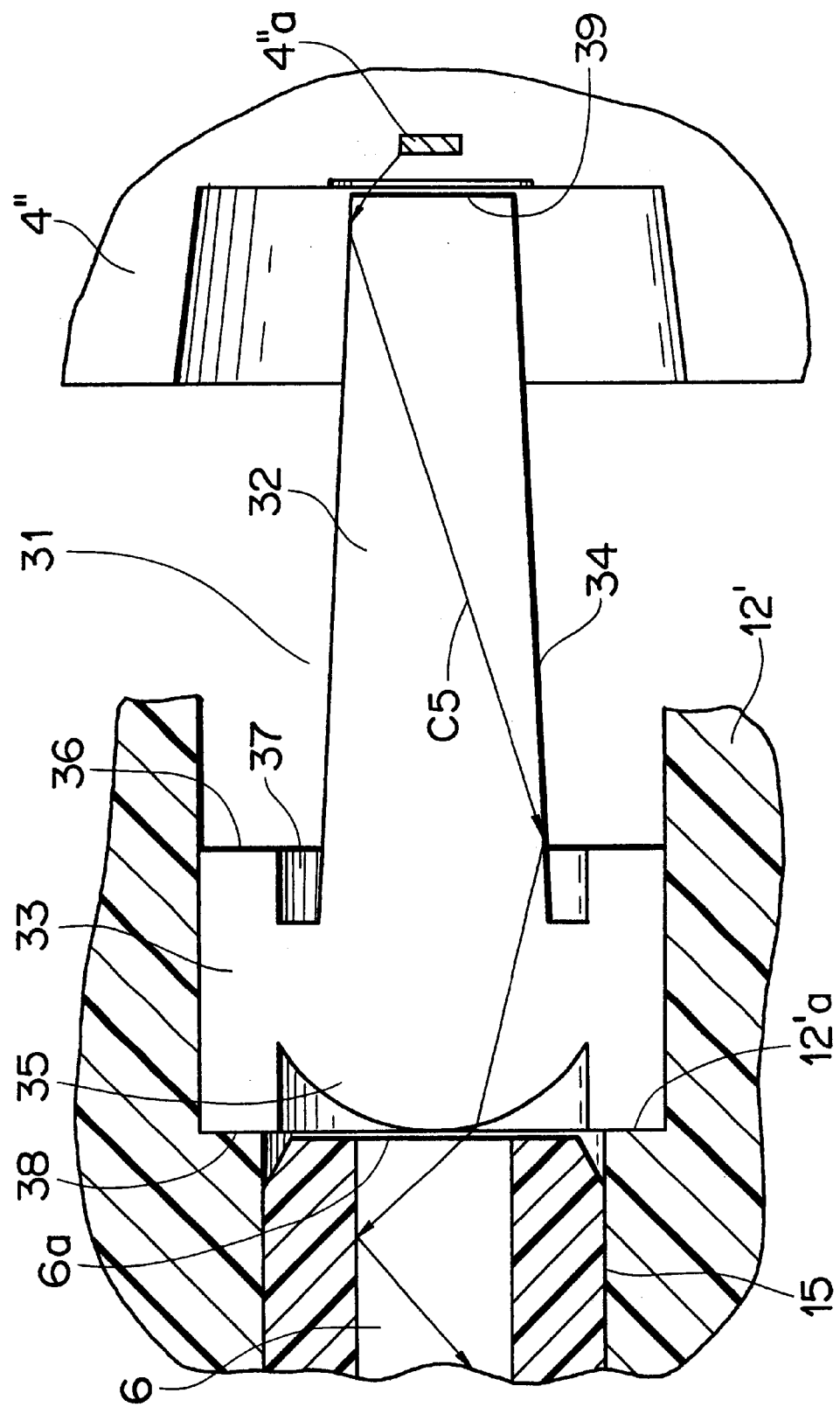

OPTICAL CONNECTOR

BACKGROUND OF THE INVENTION

1. Field of the Invention

The present invention relates to an optical connector with sleeves located between optical fibers and light-receiving/light-transmitting modules and being capable of making optical contacts therebetween.

2. Description of the Related Art

A typical optical connector with sleeves located between the optical fibers and the optical-receiving/optical transmitting module is disclosed in J-UM-6-33443 by the inventors of the invention.

FIG. 17 is a horizontal sectional view of a conventional optical connector, and FIG. 18 is a horizontal sectional view of the receptacle shown in FIG. 17. In FIGS. 17 and 18, reference numeral 1 denotes a sleeve, and reference numeral 2 denotes an optical connector.

Sleeves 1 are attached to a receptacle (connector on the side of a device) constituting the optical connector 2. These sleeves 1 are arranged between optical element modules 4 (consisting of a light-receiving module and a light-emitting module) and a pair of optical fibers 6 which are attached to an optical plug (connector on the side of the optical fiber) constituting the optical connector 2, respectively. The sleeves 1 serve to make an optical connection between the light-receiving/light-transmitting modules 4 and optical fibers 6.

A more detailed explanation will be given of the optical connector 2 as well as the sleeves 1.

The optical connector 2 includes the receptacle 3 and the optical plug 5 fit into the receptacle 3.

The receptacle 3, as shown in FIGS. 17 and 18, has a housing 7 made of synthetic resin. and having a pair of housing chambers 8. The housing chambers 8 each houses a light-receiving/light transmitting module 4 which is supported by a back sheet 9 made of elastic material such as rubber. The rear of each of the housing chambers 8 is covered with a cap 10. The receptacle 3 has a pair of receiving cylinders 12 which are arranged in front of the housing chambers 8, and extended forward so as to accord with the respective axes of lenses 11. The sleeves 1 are inserted in the receiving cylinders 12, respectively. The sleeve 1 can be formed by grinding both end surfaces of the optical fiber composed of a core and a cladding (not shown) after it has been secured to a cylindrical holder 14.

On the other hand, the optical plug 5 fits in the receptacle 3, as seen from FIG. 17 and 19 which is a horizontal sectional view of the optical plug shown in FIG. 12, includes a pair of ferule assemblies 15 each covering the optical fiber with its end face exposed at the tip of the assembly, a plug housing 17 with a pair of cylindrical partitions 16 for protecting the ferule assemblies 15 housed therein, a spring cap 17 fit over the plug housing 18 and a boot 19 fit over the rear of the spring cap 18.

The plug housing 17 has shoulders 17a each to be engaged with a flange 15a formed on the. rear half of the periphery of each ferule assembly 15. The ferule 15 is urged forward normally by a spring 20 which is located between the flange 15a and inner cylinder 18a of the spring cap 18.

As shown in FIG. 19, by engagement between the flange 15a and shoulder 17a, the tipA of the ferule assembly is always pulled more internally than the tip of the plug housing 17. The tip A of the ferule assembly 15 corresponds to the light-incident/emitting face of the optical fiber 6.

As regards the above configuration, referring to FIG. 17, an explanation will be given of connection between the receptacle 3 and the optical plug 5.

When the receptacle 3 is fit over the optical plug 5, the receiving cylinders 12 advance into the plug housing 17, and the ferule assemblies 15 also advance into the receiving cylinders 12. At this time, the ferule assembly 15 is brought into contact with the tip of the receiving cylinder 12 and a suitable contact pressure is kept by the elastic force by the spring 20.

In this state, the tip A (FIG. 19) and sleeve 1 are arranged with a minimum gap (not shown) kept. Therefore, the loss of the gap can be minimized.

The prior art described above, in which the sleeve 1 has an optical fiber 13 and is formed in a ring-shape, presents the following problems.

As shown in FIG. 20, with respect to a light beam c1 (within a range of a critical angle) which is propagated through an optical fiber 6 and sleeve 1 along an optical path indicated by arrow in FIG. 20, when the light receiving face 4a of the light receiving element module 4 is smaller than the light-emitting face 1a of the sleeve 1 (the width of the module 4 is smaller by d than that of the optical fiber 13 on the one side with respect to a center line), the light beam c1 may not be received by the light receiving element module 4. This is one of causes reducing the transmission efficiency.

Therefore, by designing the optical connector so that light-receiving module 4 can receive such optical beam c1, the transmission efficiency can be improved.

Although not shown, when the light beam emitted from the light emitting face (not shown) of the light emitting element module is diffusive-LED light, part of the light cannot enter the sleeve 1.

Even if such a light beam is incident on the sleeve 1, it becomes a light beam c2 out of the critical range of angle ($\theta$). Therefore, the light c2 does not reflect totally but permeates through the sleeve 1. The light c2 will be not be propagated.

Therefore, by designing the optical connector so that the light such as the light beam c2 is totally reflected, it is expected that the transmission efficiency can be improved.

Further, the prior art intends to minimize the gap loss to improve the transmission efficiency. However, a slight gap between the optical fiber 6 and sleeve 1 and axis displacement therebetween may influence the transmission efficiency.

There is also a problem relative to productivity of the sleeve 1 as well as the problem of the transmission efficiency.

Specifically, as described above, in order to improve the optical characteristic (transmission efficiency of light) of the sleeve 1, after the optical fiber 13 is inserted in and attached to the holder 14, both end surfaces of the optical fiber 13 as well as the holder 14 must be ground using abrasives of plural grain sizes. Thus, production of the sleeve 1 requires many manufacturing steps inclusive of necessary previous steps of making its components, and is inferior in productivity.

Further, production of the: sleeve 1, which requires monitoring the production status of its components and testing the size, is involved with complicate production management. This deteriorates the productivity of the sleeve and increases the production cost.

It is also demanded to assemble the sleeve with a receptacle smoothly.

SUMMARY OF THE INVENTION

An object of the invention is to provide an optical connector which can improve its transmission efficiency and enhance its productivity to reduce the production cost.

In order to attain the above object, in accordance with the present invention, there is provided an optical connector comprising a pair of optical fibers, light receiving/transmitting modules and sleeves each located therebetween and making an optical connection therebetween, wherein each the sleeves has a light guiding passage which is tapered from each the optical fibers toward the light receiving/transmitting modules, thereby forming a conical shape with an sloped side wall and a first end face having a reduced diameter of the light-guiding passage and arranged oppositely to each the light receiving/transmitting modules.

In this configuration, when the light propagated through the optical fiber is incident on the sleeve, it is propagated through the light-guiding passage while while repeating total reflection on the sloped side wall and gradually converged toward the light-receiving module.

On the other hand, the light which falls out of a critical angle in the prior art, can be transmitted through the light-guiding passage owing to its tapering. In this case, since the diameter of the light guiding passage increases in a propagating direction, the number of times of total reflection of the transmitted light can be decreased. Therefore, the sleeve does not retard the transmission speed of light. Thus, the transmission efficiency of light can be greatly improved.

Preferably, each the sleeves has a guiding portion enlarged in an direction perpendicular to an axis of the light-guiding passage to form a ring shape, the guiding portion being formed on the side of each the optical fibers integrally to the light guiding passage.

In this configuration, the provision of the guiding portion can be necessity of a holder or a particular attaching structure for the light-guiding:portion. The integral guiding portion formed integrally to the light-guiding passage removes necessity of providing any particular attachment to the housing, reduces the number of components and simplifies the manufacturing:-process. This contribute to easiness of the production management, improvement in the productivity and reduction in the production cost.

Preferably, the guiding portion has a ring-shaped groove formed on the end face opposite to each the light-receiving modules and successive to the side wall of the light guiding passage.

This configuration enlarges the range of an air layer abutting on the side wall of the light-guiding passage, and hence lengthens the range of total reflection of light in the light-guiding passage in the optical direction, thereby improving the efficiency of light.

Preferably, the guiding portion has a cylindrical-hood shape flange extending toward the each the light receiving/transmitting modules and surrounding the light guiding passage.

This configuration enlarges the range of supporting the sleeve so that the sleeve can be supported more stably by the housing. Therefore, the optical axis of the sleeve is not displaced, thereby improving the efficiency of light.

Preferably, the guiding portion has a projection formed along an extending direction of the flange and integrally thereto. The projection serves as a rotation stopper so that the sleeve does not rotate in the housing. Therefore, the sleeve can be arranged stably, thereby improving the efficiency of light.

Preferably, the pair of sleeves are coupled with each other by a coupling member. In this configuration, the connector housing 72 can be assembled by making an insertion operation only once. In addition, the provision of the coupling member improves the productivity and transmission efficiency.

Preferably, each the sleeves includes a lens integrally formed on its face on the side of the optical fiber, the lens making an optical connection with the optical fiber and being convex toward it.

In this configuration, since the lens is formed integrally to the light guiding passage, the adverse effect from the gap between the optical fiber and sleeve and displacement of the direction of the optical axis are relaxed, thereby improving the transmission efficiency of light.

Preferably, the lens is arranged so that its apex does not protrude from the end face of the guiding portion on the side of each the optical fibers.

In this configuration, the guiding portion serves as a member for protecting the lens. The sleeve, before it is assembled, can be easily managed.

The second end face of the light-guiding passage opposite to the first end face is served as a light-receiving face receiving light propagated through each the optical fibers, the light receiving face having a larger diameter of an end face of each the optical fibers which serves as a light emitting face. In this configuration, a larger amount of light can be received from the optical fiber, thereby improving the transmission efficiency of light.

Preferably, the first end face of the light-guiding passage is served as a light emitting face emitting light to be propagated toward a light receiving face of the light receiving module, the first end face having a smaller diameter than that of light receiving face.

In this configuration, a larger amount of light can be received from the light receiving module, thereby further improving the transmission efficiency of light.

Preferably, the first end face of the light-guiding passage is served as a light receiving face receiving light to be transmitted from an light emitting face of the light-transmitting module, the first end face having a larger diameter than the light emitting face.

In this configuration, a larger amount of light can be received from the light receiving module, thereby further improving the transmission efficiency of light.

Preferably, the light guiding passage is mainly made of transparent resin.

Therefore, the sleeve can be easily manufactured by injection molding. This simplifies the manufacturing process, improves the production efficiency, and reduces the production cost.

Preferably, the each the sleeves is coated with an anti-reflecting film in its light receiving face.

The anti-reflective film serves to prevent reduction in the amount of incident light, thereby further improving the transmission efficiency of light.

The above and other objects and features of the invention will be more apparent from the following description taken in conjunction with the accompanying drawings.

BRIEF DESCRIPTION OF THE DRAWINGS

FIG. 3 is a view for explaining the state where a light beam is transmitted from an optical fiber to a receiving device through a convergent sleeve;

FIG. 8 is a view for explaining the state where the light beam is transmitted from a transmission device to an optical fiber through he sleeve of FIG. 6;

DESCRIPTION OF THE PREFERRED EMBODIMENTS

Figure 1:
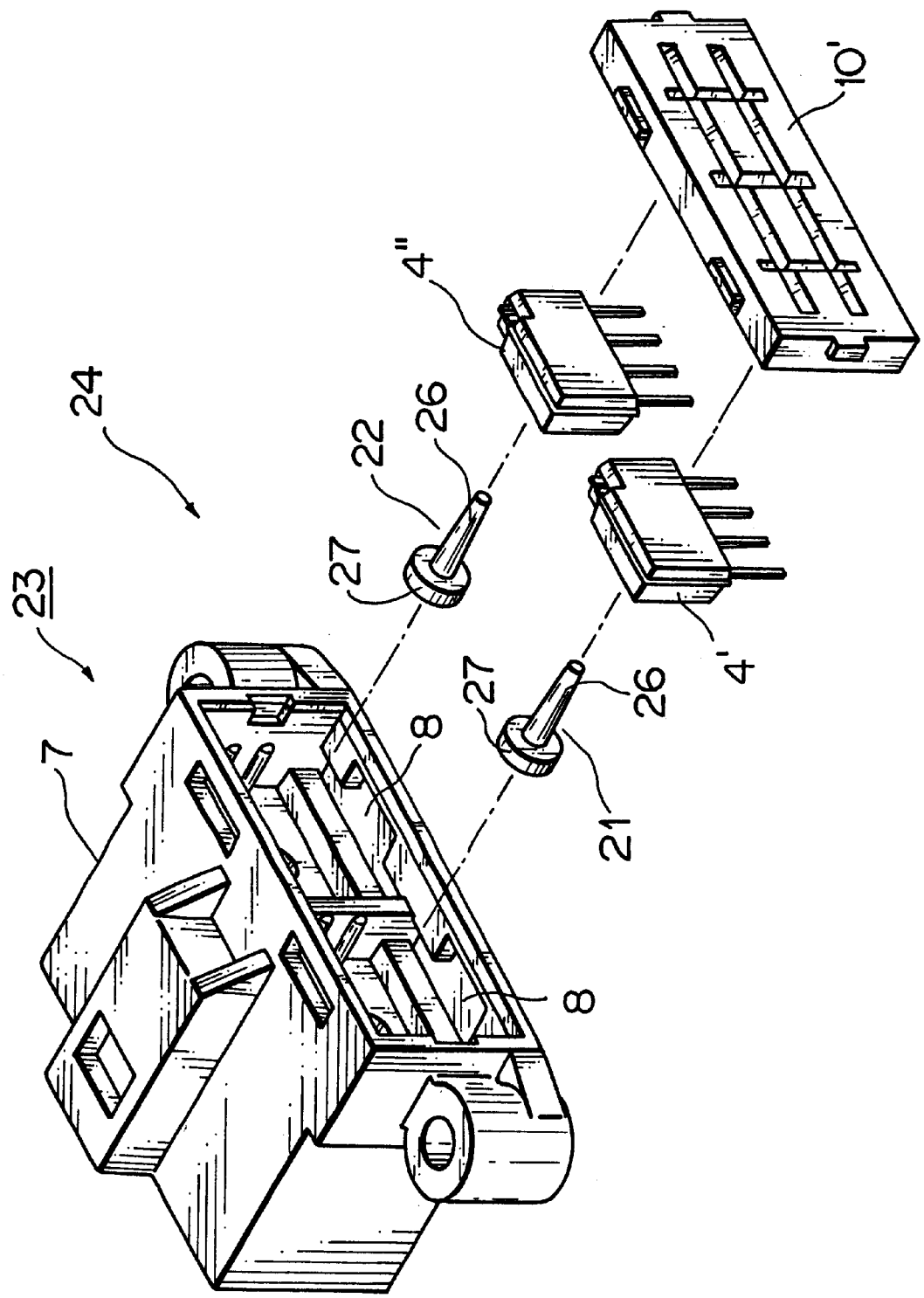
FIG. 1 is an exploded perspective view of an embodiment of an optical connector according to he invention.

Now referring to the drawings, an explanation will be given of various embodiments of the present invention.

Figure 2:
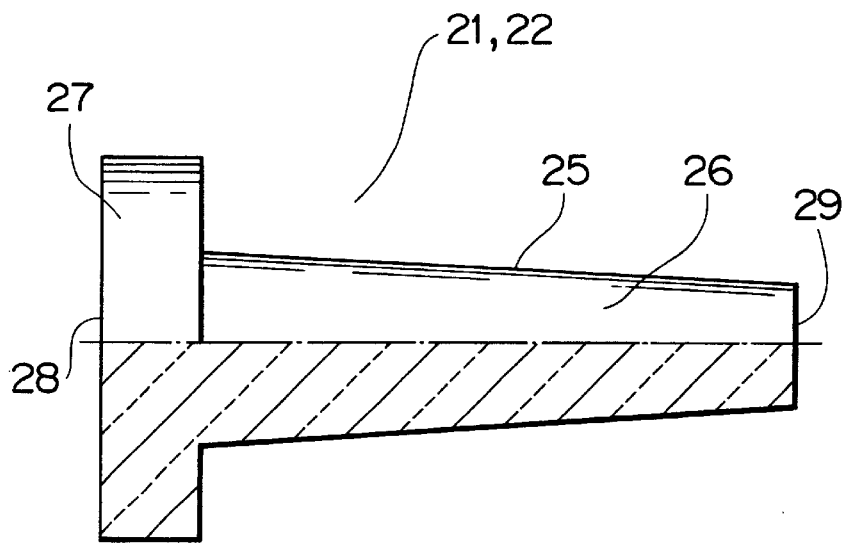
FIG. 2 is a plan view of a partial section of the sleeve in FIG. 1.
Figure 4:
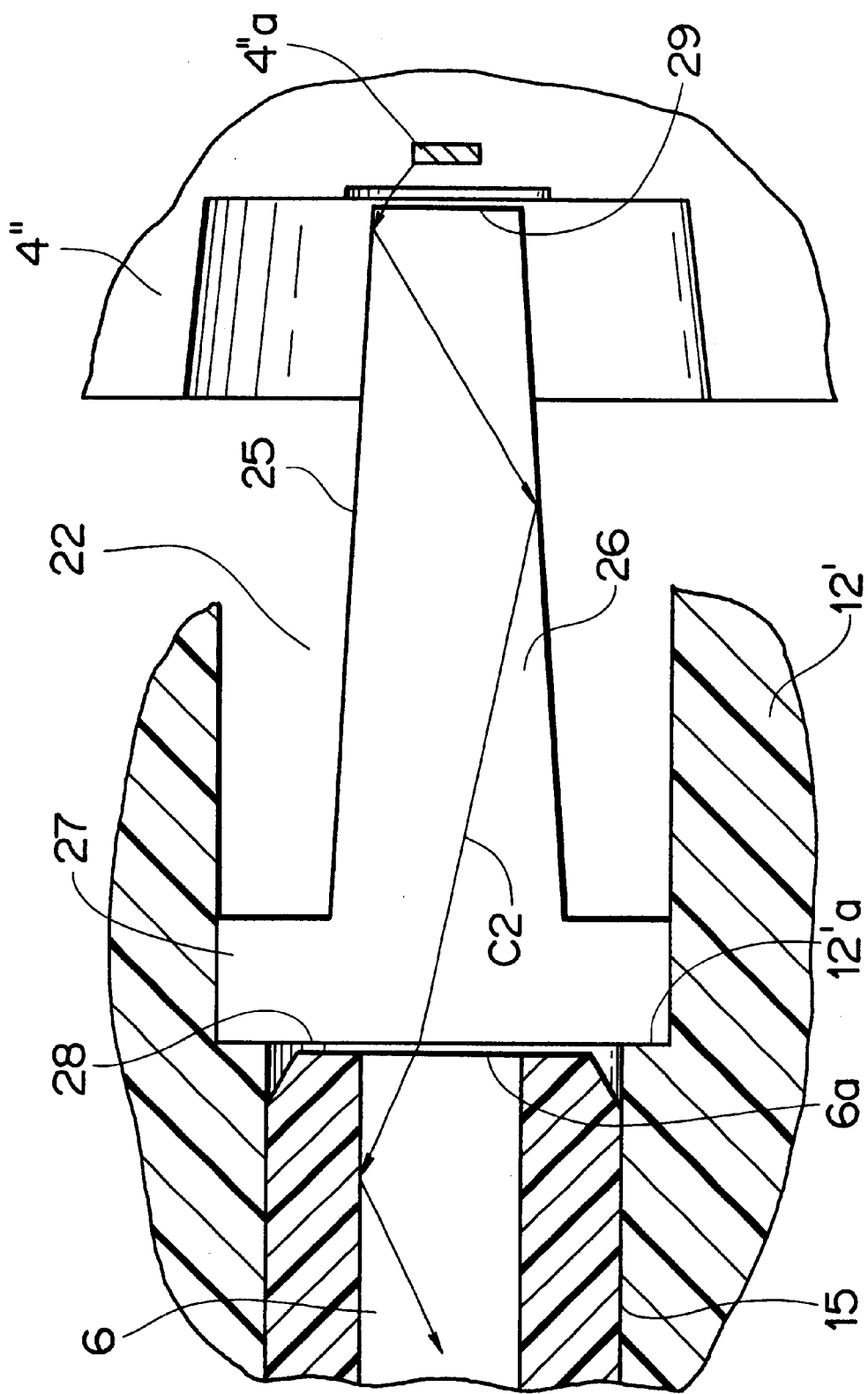
FIG. 4 is a view for explaining the state where the light beam is transmitted from a transmission device to an optical fiber through a divergent sleeve.

FIG. 1 is an exploded perspective view of an embodiment of an optical connector according to he invention; FIG. 2 is a plan view of a partial section of the sleeve in FIG. 1; FIG. 3 is a view for explaining the state where a light beam is transmitted from an optical fiber to a receiving device through a convergent sleeve; and FIG. 4 is a view for explaining the state where the light beam is transmitted from a transmission device to an optical fiber through a divergent sleeve;

In these figures, like reference numerals refer to like elements in the prior art. The optical plug which constitutes the optical connector, which is, basically the same as the prior art, will not be explained here.

In FIG. 1, reference numerals 21 and 22 denote a convergent sleeve and a divergent sleeve, respectively. Reference numeral 23 denotes an optical connector.

The sleeves 21 and 22 are units which are formed by injection-molding transparent light-transmissive synthetic resin such as acryl.

Figure 19:
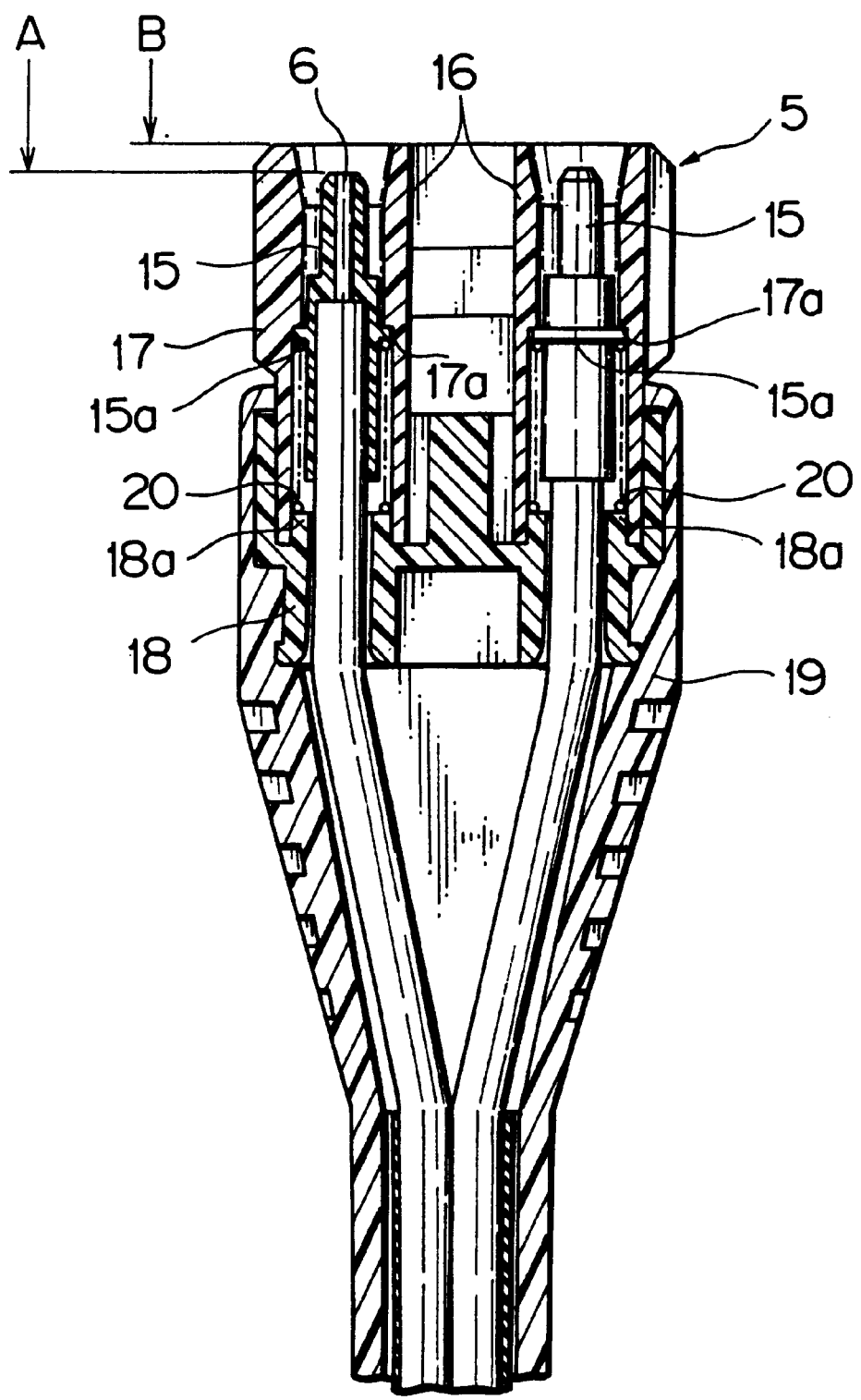
FIG. 19 is a sectional view in a horizontal direction of the optical plug shown in FIG. 17.

The sleeves 21 and 22 as well as a light-receiving device 4', light-transmitting device 4" and a cap 10' are to be mounted in a receptacle 24 constituting the optical connector 23. When an optical plug 5 (FIGS. 17 and 19) constituting the optical connector is fit in the receptacle 24, an optical connection with high transmission efficiency can be made in the optical connector 23.

More specifically, as shown in FIG. 2, the sleeves 21 and 22 are gradually tapered from the side of the optical fibers (FIGS. 17 and 19) toward the light-receiving device 4' or light-transmission device 4" (FIG. 1), thereby forming a light-guiding passage 26 having a conical shape with its sloped side wall 25. A guiding portion 27 supported by a receiving cylinder 12' (described later with reference to FIG. 3) of a housing 7 (FIG. 1) is formed integrally to the light guiding passage 26.

The one end surface 28 of the light-guiding passage 26 making an optical connection with the fiber 6 (FIG. 3) (which is a light-receiving face or light-emitting face according to the direction of light transmission) is designed to have a larger diameter than that of the end face 6a (FIG. 3) of the optical fiber 6. On the other hand, the other end surface 29 of the light-guiding passage 26, which is opposite to the end surface 28 and makes an optical connection with the light receiving device 4', is designed:to have a larger diameter than the light-emitting face 4"a (FIG. 4) of the transmission device 4".

The guide portion 27 is enlarged in an direction perpendicular to the axis (not shown and coincident to the direction of extending the sleeve) of the light-guiding passage 26 to form a ring shape.

The receptacle 24 has a housing 7 of synthetic resin including a pair of housing chambers 8 corresponding to the light-receiving device 4' and light-transmitting device 4".

In the middle position of the inside of the housing 7, a receiving cylinder 12' is formed successively to the housing chamber 8 so as to extend toward the optical fiber 6 in parallel to the optical axis when the light-receiving device 4' (FIG. 3) or transmission device 4" (FIG. 4). The receiving cylinder 12' has a ring-shaped step 12' a with which the guiding potion 27 of the sleeve 21 (FIG. 3) or sleeve 22 (FIG. 4) is in contact.

Referring to FIG. 1, an explanation will be given of a process for assembling the optical connector according to the invention.

The sleeves 21 and 22 and the pair of receiving cylinders 12' (FIGS. 3 and 4) are inserted into the housing 7 from its rear side. The light-receiving device 4' and light-transmitting device 4" are accommodated in the corresponding chambers 8. A cap 10' is put on the rear of the housing 7. Thus, the assembling of the receptacle 24 is completed. In this state, the optical plug 5 (FIGS. 17 and 19) can be fit into the receptacle.

Once the optical plug 5 (FIGS. 17 and 19) has been fit into the receptacle 24, as shown in FIGS. 3 and 4, the sleeves 21 and 22 are brought into contact with the corresponding steps 12a. Thus, the gap between the light-receiving device 4' (FIG. 3) or light-transmitting device 4" (FIG. 4) and the ferule assembly 15 is minimized and hence the gap loss in the direction of the optical axis can be also minimized.

Figure 17:
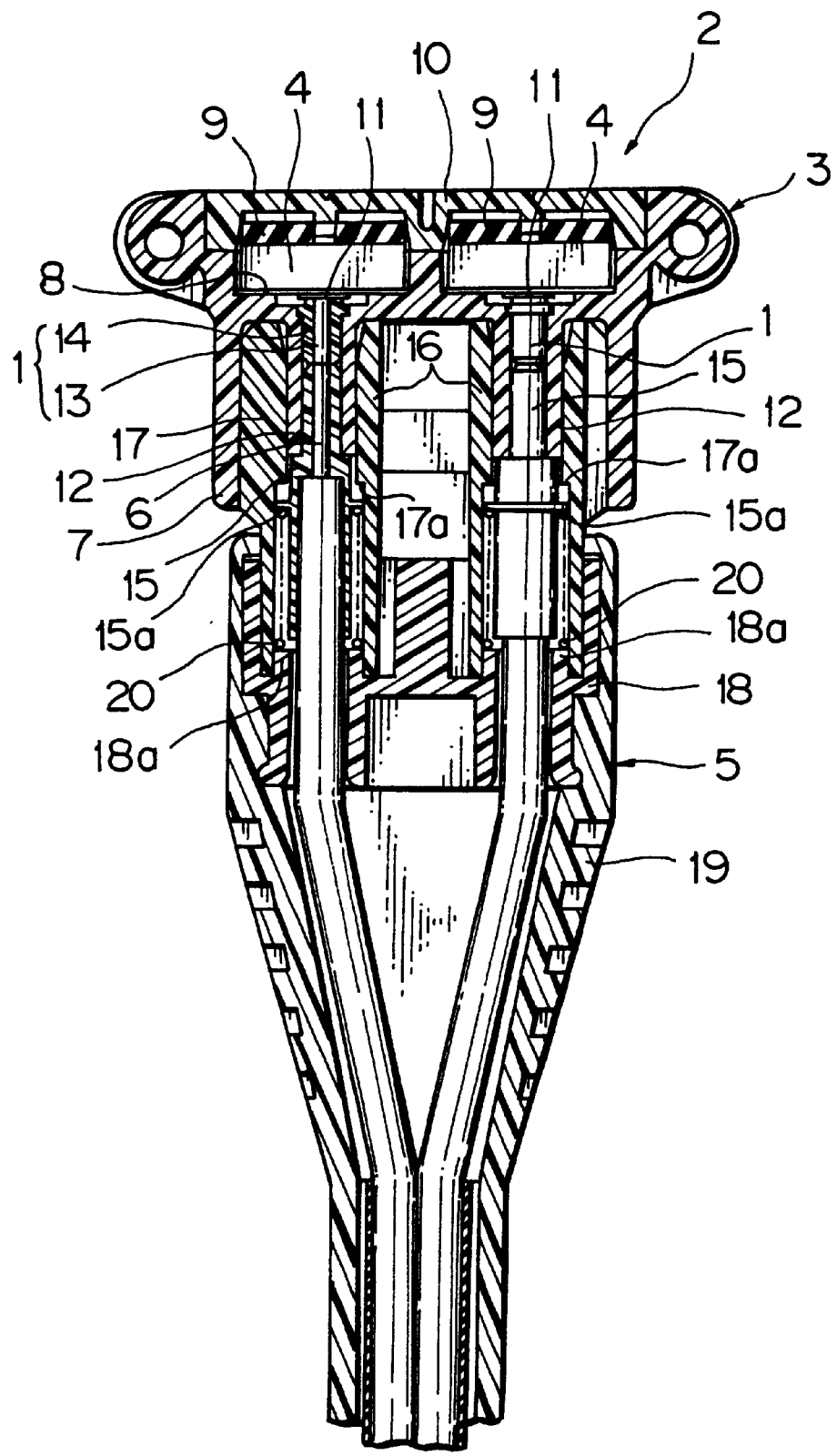
FIG. 17 is a sectional view in a horizontal direction of a conventional optical connector.
Figure 18:
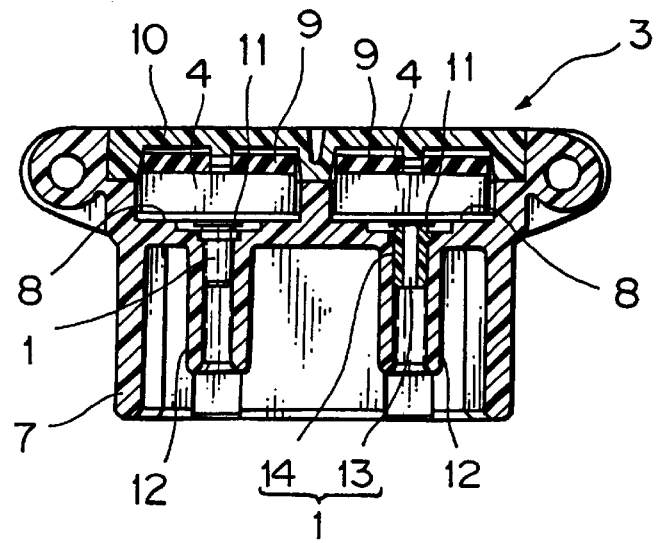
FIG. 18 is a sectional view in a horizontal direction of the receptacle shown in FIG. 17.
Figure 20:
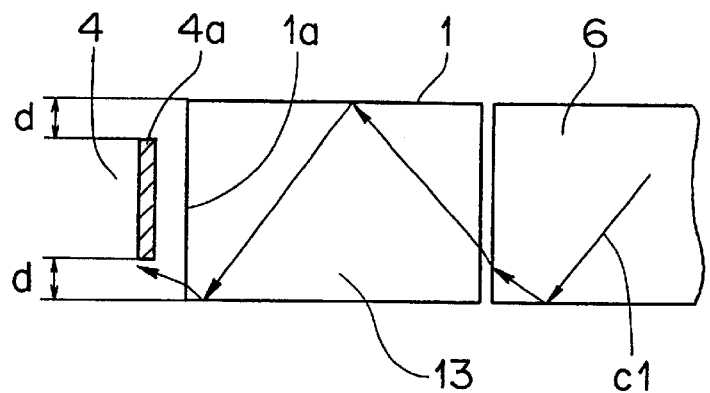
FIG. 20 is a view for explaining the state where light is propagated from an optical fiber to a light receiving element module through the sleeve shown in FIG. 17.
Figure 21:
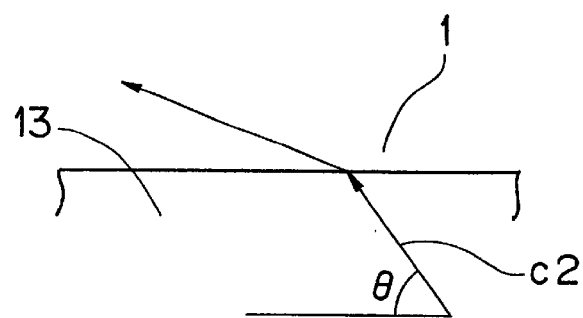
FIG. 21 is a view for explaining the state where the light out of a critical angle range is incident on the sleeve

Incidentally, the optical plug can be fit into the receptacle in the same manner as the conventional manner. The light-receiving device 4' and light-transmitting device 4" are the same as the light-receiving/light-transmitting modules 4 in their performance. The cap 10' has tri-angular protrusions which permit the back sheets from being omitted from the conventional cap 1 (FIGS. 17 and 18).

Referring to FIG. 3, an explanation will be given of the manner in which light is propagated from the optical fiber 6 to the light-receiving device 4' via the sleeve 21.

As indicated by arrow in FIG. 3, a light beam propagated through the optical fiber 6 while repeating total reflection emerges from its end face 6a (light-emitting face) and is incident on the sleeve 21 through the end face 28. In this case, since the light-guiding passage 26 is tapered toward the light-receiving device 4 and the side wall thereof abuts on an air layer, the light beam c1 is converged while repeating total reflection and is incident on the light-receiving face 4'a of the light-receiving device 4' with no loss.

On the other hand, the light beam propagated from the light-transmitting device 4" to the optical fiber 6 through the sleeve 22 takes an optical passage indicated by arrow in FIG. 4. Specifically, the LED light beam c2 emerging from the light-emitting face 4"a of the light-transmitting device 4" is incident on the sleeve 22 through the end face 29 of the sleeve 22. As in the previous case, in this case also, since the light-guiding passage 26 is tapered toward the light-transmitting device 4" and the side wall thereof abuts on the air layer, the light beam c2 is diverged while repeating total reflection and is incident with no loss on the optical fiber 6 through the end face 6a (light-emitting face) thereof.

A further explanation is will be made on the arrangement in which the light-guiding passage 26 is tapered toward the transmitting device 4".

Figure 5:
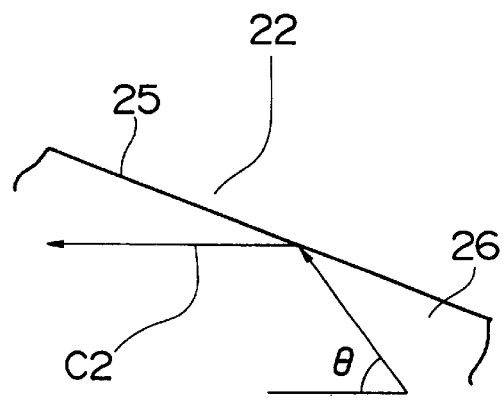
FIG. 5 is a view for explaining the state where the light beam which falls out of a range of a critical angle in the state of FIG. 4.

As regard the sleeve 22, as shown in FIG. 4, the diameter of the light-guiding passage 26 increases toward the propagating direction of light. In this case, the number of times of total reflection in the light-guiding passage 26 of the sleeve 22 of the light beam c2 incident through the end face 29 is fewer than that of total reflection through the sleeve 21. Thus, the number of times of total reflection of the LED light beam C2 through the, optical fiber 6 also becomes fewer. Therefore, the sleeve 22 does not retard the transmission speed of the LED light beam C2.

Where the LED light beam c2 not within a critical range of angle in the prior art is incident on the sleeve 22, a permissible angle is changed by the tapering degree of the light guiding passage 26. Thus, the LED light beam c2 does not pass but is reflected. This contributes to the conventional problem (FIG. 5).

Thus, as understood from the explanation on FIGS. 1 to 5, the sleeves 21 and 22 including the light-guiding passage 26 can improve the transmission efficiency.

The sleeve which is integrally molded of a transparent light-permeable synthetic resin can be simplified in its manufacturing process, thereby improving the production cost.

The integral guiding portion 27 of the sleeve removes necessity of providing any particular attachment to the housing 7, reduces the number;of components and simplifies the manufacturing process. This contributes to easiness of the production management, improvement in the productivity and reduction in the production cost.

Figure 6:
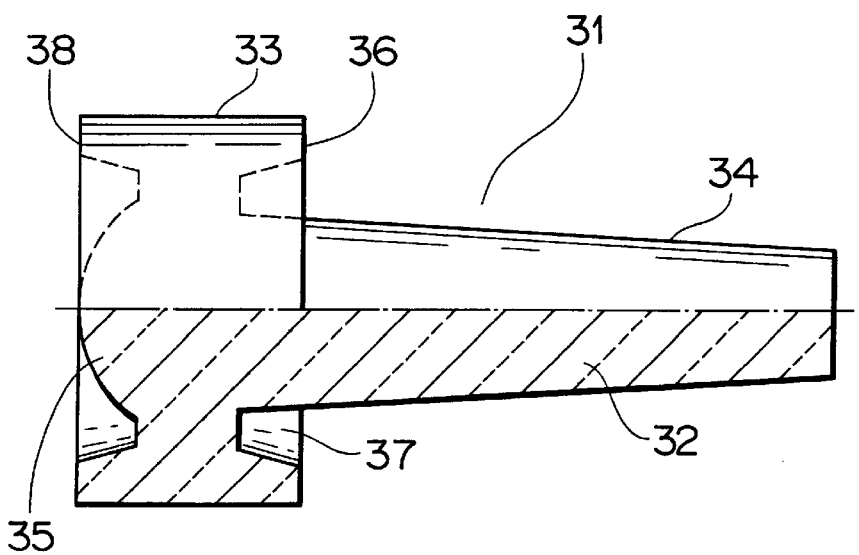
FIG. 6 is a plan view of a partial section of a modification of the sleeve in FIG. 1.

Referring to FIG. 6, an explanation will be given of a modification of the sleeves,21 and 22.

In FIG. 6, like the sleeves 21 and 22, a sleeve 31 includes a light guiding passage 32 and guiding portion 33. The sleeve 31 is formed as an integral unit by injection-molding transparent light-permeable synthetic resin (such as acryl).

The sleeve 31 is gradually tapered from the side of an optical fiber 6 (FIGS. 7 and 8) toward the light-receiving device 4' (FIG. 7) or light-transmitting device 4" (FIG. 8), thereby forming a light-guiding passage having a conical shape with its sloped side wall 34. The sleeve 31 includes a lens 35 integrally formed on its face on the side of the optical fiber 6. The lens 35 is convex toward the optical fiber 6.

In this embodiment, although the lens 35 is designed as a spherical lens having a prescribed radius of curvature, it may be a non-spherical lens having a plurality of radii of curvature. The lens, which is convex toward the optical fiber, improves the transmission efficiency of light.

Figure 7:
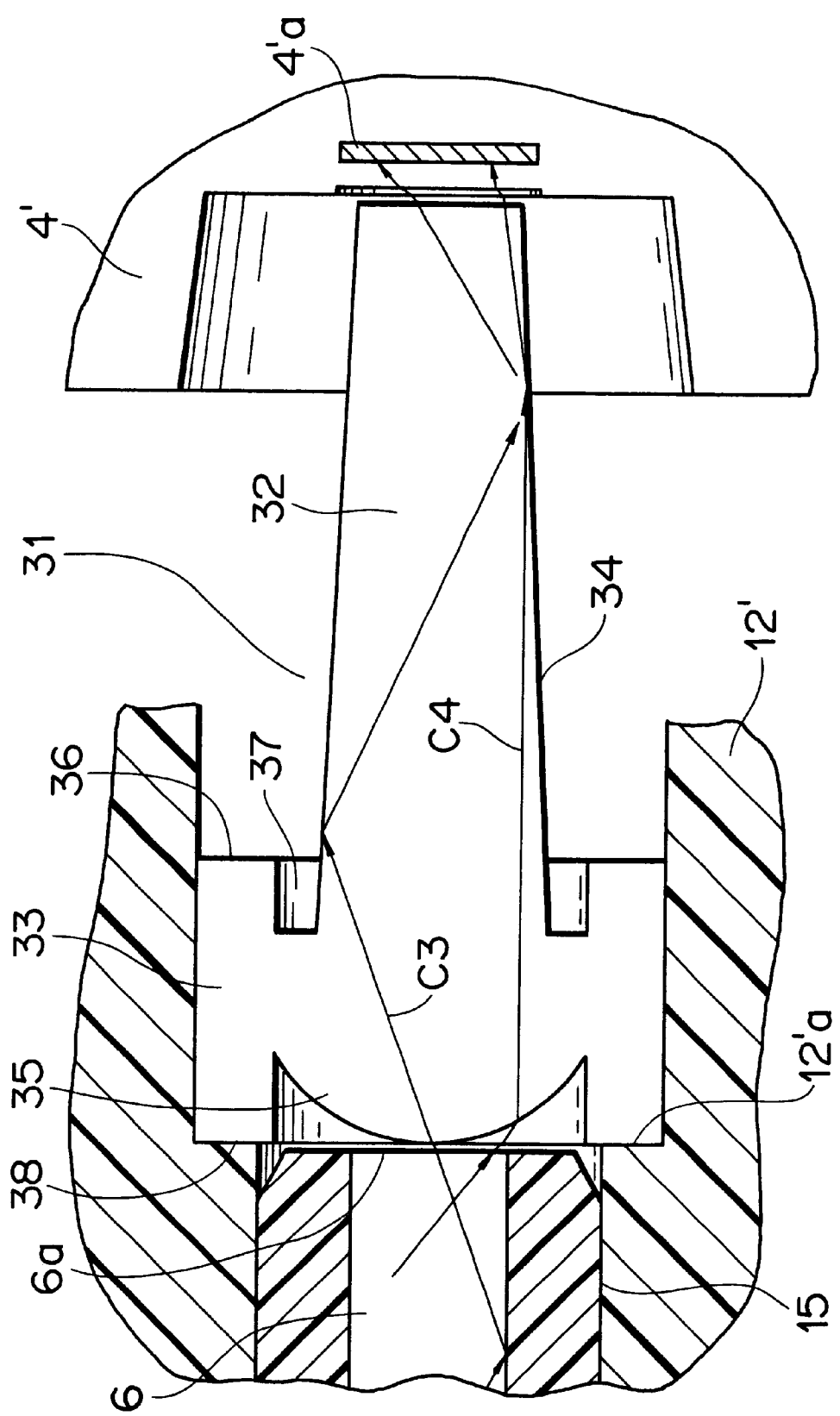
FIG. 7 is a view for explaining the state where a light beam is transmitted from an optical fiber to a receiving device through the sleeve of FIG. 6.

The guiding portion 33 is formed integrally to the light guiding passage 32 on the side of the optical fiber 6 (FIGS. 7 and 8). The guiding portion 33 is enlarged in an direction perpendicular to the axis (not shown and coincident to the direction of extending the sleeve) of the light-guiding passage 32 to form a ring shape.

The guiding portion 33 has a ring-shaped groove formed on the end face opposite to the light-receiving device 4' (FIG. 7) or light-transmitting device 4" (FIG. 8) and successive to the side wall 34 of the light guiding passage 32. The groove 37 serves to enlarge the extent of an air layer abutting on the side wall 34.

The guiding portion 33 surrounds the periphery of the lens 35 so as to protect it. The guiding portion 33 has an end surface 38 on the side of the optical fiber 6, which coincides with the apex of the lens 35 and projects slightly therefrom toward the optical fiber 6.

Like the sleeves 21 and 22, the sleeve 31 is adapted to be inserted into the housing 7 (FIG. 1). As seen from FIGS. 7 and 8, the sleeve 31 is in contact with the step 12'a of the receiving cylinder 12'. When the receptacle 24 is fit over the optical plug 5 (FIG. 1 and FIGS. 17 and 19), the gap between the light-receiving device 4' (FIG. 7) or light-transmitting device 4" (FIG. 8) and the ferule assembly 15 is minimized and the gap loss in the direction of the optical axis is also minimized.

Referring to FIG. 7, an explanation will be given of the manner in which light is propagated from the optical fiber 6 to the light-receiving device 4' via the sleeve 31.

As indicated by arrow in FIG. 7, light beams c3 and c4 propagated through the optical fiber 6 while repeating total reflection emerges from its end face 6a (light-emitting face) and is incident on the sleeve 31 through the lens 35. In this case, since the light-guiding passage 32 is tapered toward the light-receiving device 4' and the side wall thereof abuts on an air layer, the light beams c3 and c4 are converged while repeating total reflection and are incident on the light-receiving face 4'a of the light-receiving device 4' with no loss.

On the other hand, the light beam propagated from the light-transmitting device 4" to the optical fiber 6 through the sleeve 22 takes an optical passage indicated by arrow in FIG. 8. Specifically, the LED light beam (inclusive of a laser beam) c5 emerging from the light-emitting face 4"a of the light-transmitting device 4" is incident on the sleeve 31 through the end face 29 of the sleeve 22. As in the above case, in this case also, since the light-guiding passage 32 is tapered toward the light-transmitting device 4" and the side wall thereof abuts on the air layer, the light beam c5 is diverged while repeating total reflection to reach the lens 35.

Successively, the LED light beam c5 is converged by the lens 35 and is incident with no loss on the optical fiber 6 through the end face 6a (light-emitting face) thereof.

The lens 35 does not perform the converging operation which exerts an influence on the transmission speed of the LED light beam c5. Therefore, the sleeve 31 provides the same effect as the sleeve 22.

Thus, as understood from the explanation on FIGS. 6 to 9, the sleeve 31 including the light-guiding passage 32 can improve the transmission efficiency like the sleeves 21 and 22.

The sleeve 31 which is integrally molded of a transparent light-permeable synthetic resin can be simplified in its manufacturing process, thereby improving the production cost.

The integral guiding portion 33 of the sleeve 31 removes necessity of providing any particular attachment to the housing 7, protects the lens 35, reduces the number of components and simplifies the manufacturing process. This contribute to easiness of the production management, improvement in the productivity and reduction in the production cost.

Since the lens 35 is formed integrally to the light guiding passage 32, the adverse effect from the gap between the optical fiber 6 and sleeve 31 and displacement of the direction of the optical axis are relaxed, thereby improving the transmission efficiency of light.

Figure 9:
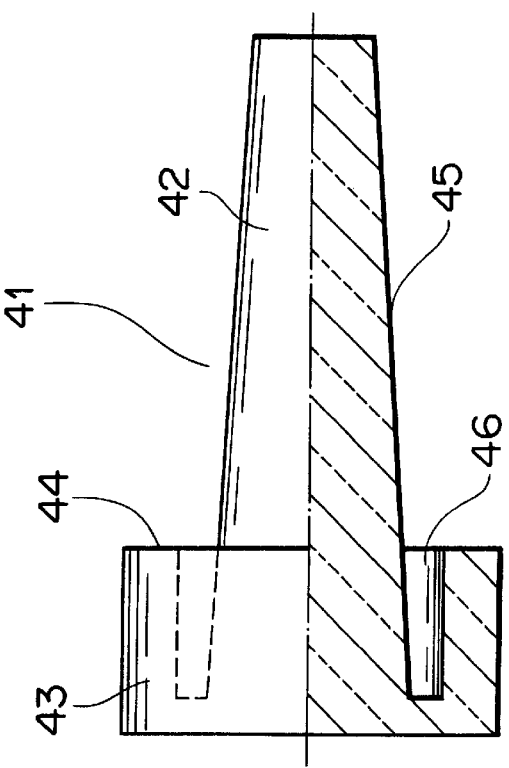
FIG. 9 is a plan view of a partial section of another modification of the sleeve in FIG. 1.

Referring to FIG. 9, an explanation will be given of a further modification of the sleeves 21 and 22.

In FIG. 9, like the sleeves 21 and 22, a sleeve 41 includes a light guiding passage 42 and guiding portion 43. The sleeve 41 is formed as an integral unit by injection-molding transparent light-permeable synthetic resin (such as acryl).

The light guiding passage 42, which has basically the same structure as that of the light guiding passage 26, will not explained here.

The guiding portion 43 is formed integrally to the light guiding passage 42 on the side of the optical fiber 6 (FIGS. 7 and 8). The guiding portion 43 is enlarged in an direction perpendicular to the axis (not shown and coincident to the direction of extending the sleeve) of the light-guiding passage 42 to form a ring shape. The guiding portion 43 has a ring-shaped groove formed. on the end face opposite to the light-receiving device 4' (FIG. 3) or light-transmitting device 4" (FIG. 4) and successive to the side wall 44 of the light guiding passage 42. The groove 46 serves to enlarge the extent of an air layer abutting on the side wall 45.

The sleeves 21 and 22 described with reference to FIGS. 1 to 4 may be replaced by the sleeve 41, thereby further improving the transmission efficiency.

Figure 10:
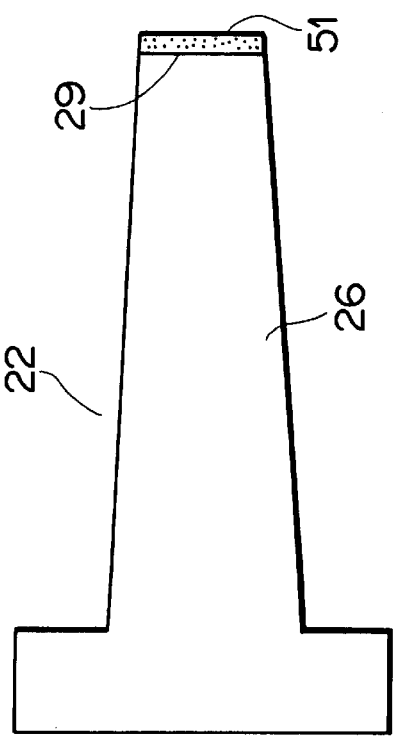
FIG. 10 is a view showing the sleeve of FIG. 1 coated with an anti-reflective film.

FIG. 10 shows the state where the light-receiving face (end face 29) of the sleeve 22 is coated with an anti-reflective film 51.

The anti-reflective film 51, i.e. dielectric laminated on the light receiving face serves to prevent reduction in the amount of incident light, thereby further improving the transmission efficiency of light.

The anti-reflective film 51 is deposited on at least the light-receiving face (end face in FIG. 10), and may be deposited on the entire outer surface of the sleeve. It is of course that the anti-reflective film 51 may be applied to the various sleeves 21, 31 and 41 as described previously and a sleeve 61 described later.

Figure 11:
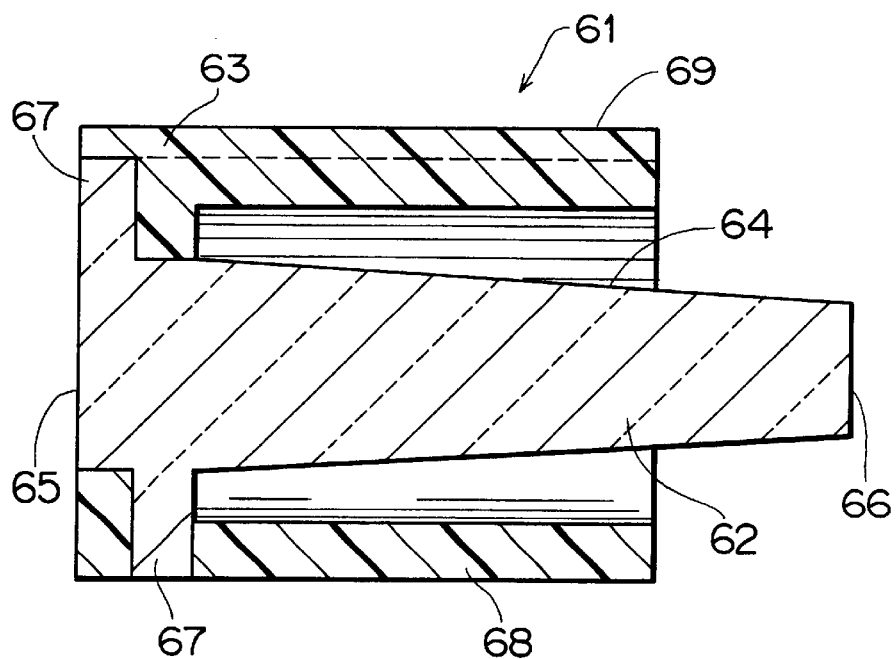
FIG. 11 is a sectional view of a further example of the sleeve of FIG. 1.

Referring to FIG. 11, an .explanation will be given of a further modification of the sleeves 21 and 22.

In FIG. 11, like the sleeves 21 and 22, a sleeve 31 includes a light guiding passage 62 and guiding portion 63. The light guide passage 62 is injection-molded using transparent light-permeable synthetic resin (e.g. acryl), and thereafter "two-color molded" with the guiding portion 63.

The sleeve 61 is gradually tapered from the side of an optical fiber 6 (FIG. 14) toward the light-receiving device 4' (FIG. 14) or light-transmitting device 4" (FIG. 15), thereby forming a light-guiding passage having a conical shape with its sloped side wall 64.

The one end surface 65 of the light-guiding passage 62 making an optical connection with the optical fiber 6 (FIGS. 14 and 15) (which is a light-receiving face or light-emitting face according to the direction of light transmission) is designed to have a larger diameter than that of the end face 6a (FIGS. 14 and 15) of the optical fiber 6. On the other hand, the other end surface 66 of the light-guiding passage 62, which is opposite to the end surface 65 and makes an optical connection with the light receiving device 4' (FIG. 14), is designed to have a larger diameter than the light-emitting face 4'a (FIG. 14) of the transmission device 4'.

Where the end face 66 is to be optically coupled with the light-transmitting device 4" (FIG. 15), it is designed to have a larger diameter than that of the light emitting face 4" of the light transmitting device 4".

The sleeve 61 has four projections 67 formed at regular intervals circumferentially on the side of the optical fiber 6, which is successive to the side wall of the light guiding passage 62. The projections are stepped in a direction of the optical axis of the sleeve 61 (FIG. 11).

The sleeve 61 is provided with a guiding portion 63 molded by "two color-molding" on the light guiding passage 64 through the four projections 67. The guiding portion 63 has a cylindrical-hood shape flange 68 extending toward the light receiving/transmitting:device and surrounding the light guiding passage 62 and a projection 69 as a rotating-stopper formed along. the extending direction of the flange 68.

Figure 13:
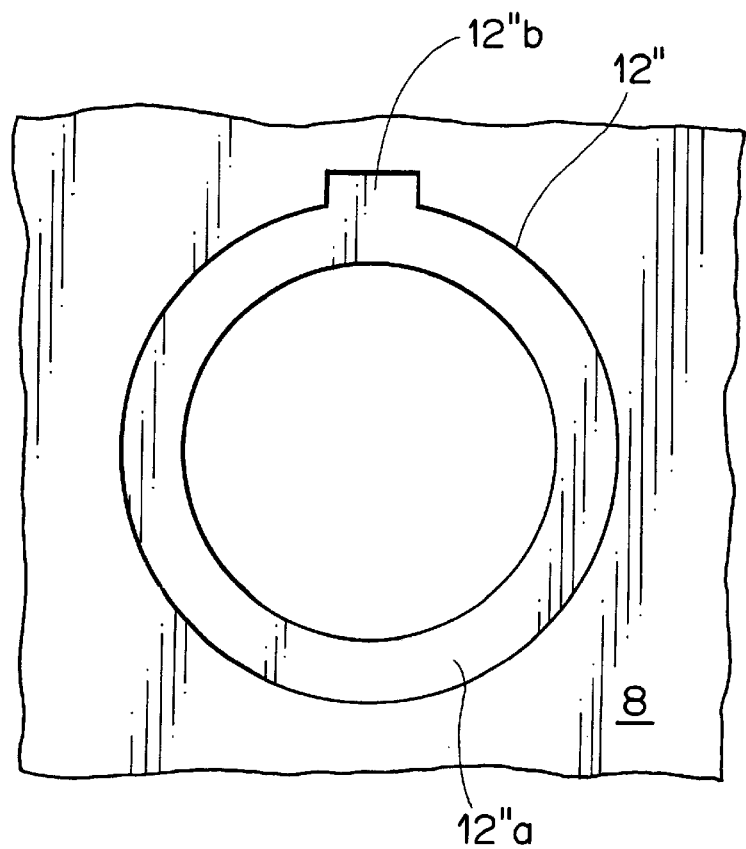
FIG. 13 is a plan view of a receiving cylinder into which the sleeve of FIG. 11 is to be inserted.

The guiding portion 63, which is composed of the flange 68 and projection 69, permits the light guiding passage 62 to be stably located in the receiving cylinder 12" (FIG. 13). The flange 68 also prevents the light guiding passage 62 from being easily swung.

The projection may be omitted. As shown in FIG. 13, the receiving cylinder 12" has a stepping portion 12"a with which the end face 65 (FIG. 11) of the sleeve 61 is to be brought into contact and a convex portion 12"b into which the projection 69 (FIG. 11) is to be slid. Only in this point, the receptacle according to this embodiment is different from the receptacle 24 shown in FIG. 1.

Figure 14:
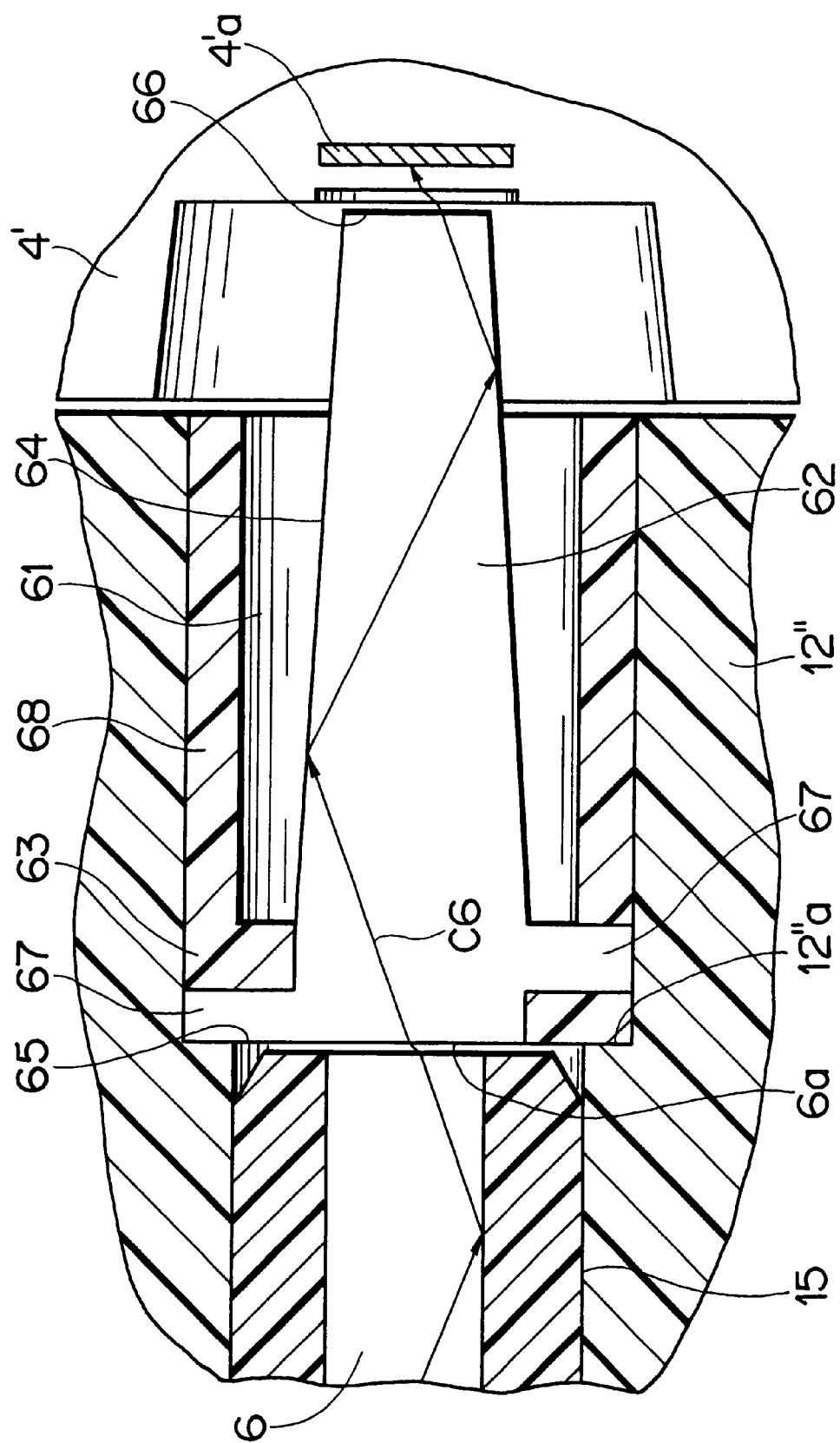
FIG. 14 is a view for explaining the state where a light beam is transmitted from the optical fiber to the receiving device through sleeve of FIG. 11.
Figure 15:
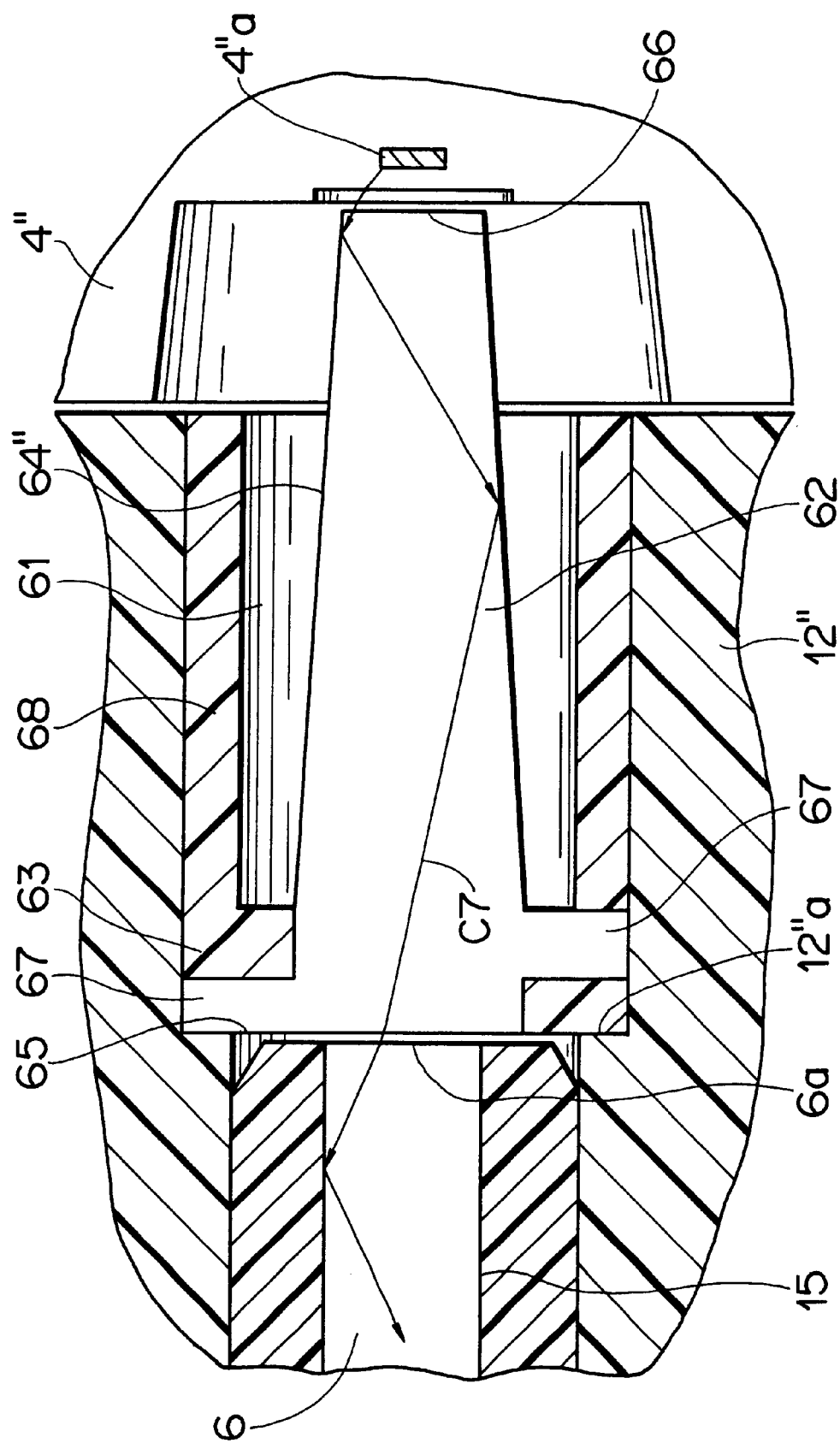
FIG. 15 is a view for explaining the state where the light beam is transmitted from a transmission device to an optical fiber through the sleeve of FIG. 11.

Referring to FIG. 14, an explanation will be given of the manner in which light is propagated from the optical fiber 6 to the light-receiving device 4' via the sleeve 61.

As indicated by arrow in FIG. 14, a light beam propagated through the optical fiber 6 while repeating total reflection emerges from its end face 6a (light-emitting face) of the optical fiber 6 and is incident. on the light-guiding passage 62 through the end face 65. In this case, since the light-guiding passage 62 is tapered toward the light-receiving device 4' and the side wall thereof abuts on an air layer, the light beam c6 is converged while repeating total reflection and is incident on the light-receiving face 4'a of the light-receiving device 4' with no loss.

On the other hand, the light beam propagated from the light-transmitting device 4" to the optical fiber 6 through the sleeve 61 takes an optical passage indicated by arrow in FIG.

15. Specifically, the LED light beam c7 emerging from the light-emitting face 4"a of the light-transmitting device 4" is incident on the sleeve 62 through the end face 66 of the sleeve 62. As in the cases described above, in this case also, since the light-guiding passage 62 is tapered toward the light-transmitting device 4" and the side wall thereof abuts on the air layer, the light beam c7 is diverged while repeating total reflection and is incident with no loss on the optical fiber 6 through the end face 6a (light-emitting face) thereof.

It should be noted that the sleeve 61 does not exert an influence on the transmission speed.

The use of the sleeve 61 provides the same effect as the various sleeves described above.

The flange 68 can be applied to the various sleeves in several embodiments described previously. Further, the lens 35 shown in FIGS. 6–8 may be added to the sleeve 61.

Figure 12:
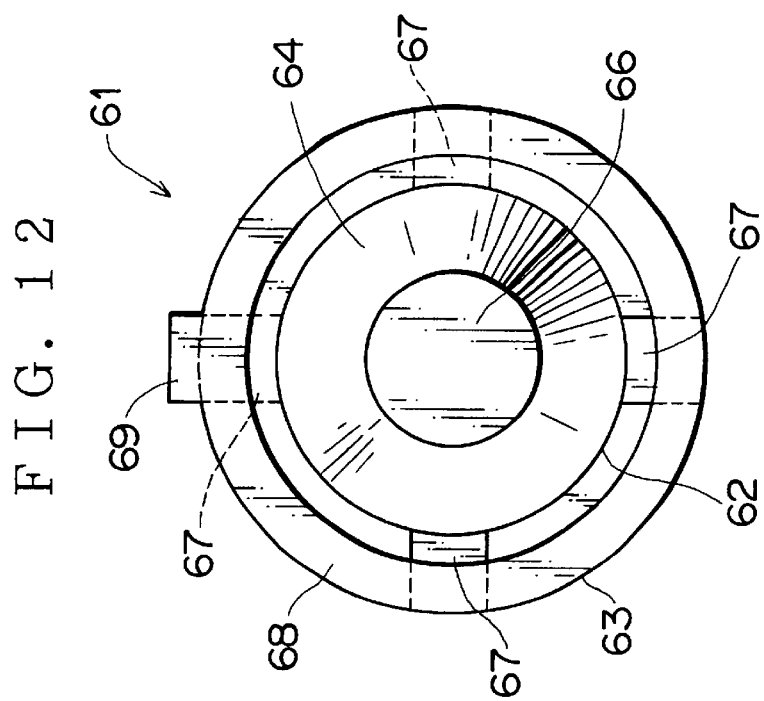
FIG. 12 is a front view of the sleeve of FIG. 11.
Figure 16:
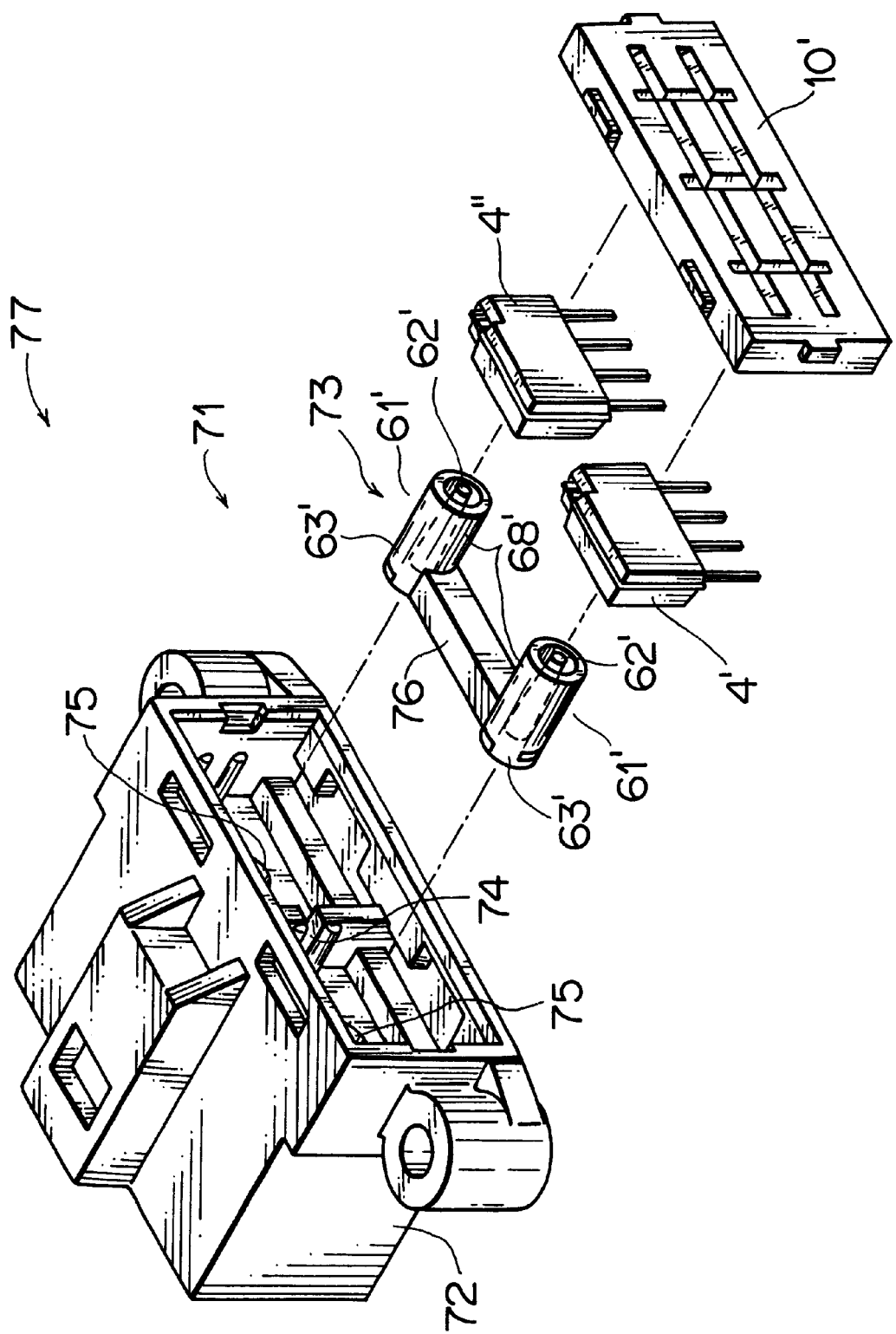
FIG. 16 is an exploded perspective view of a receptacle of a modification of the sleeve of FIG. 11.

Now referring to FIG. 16, an explanation will be given of a modification of the sleeve 61 (FIGS. 11 and 12). FIG. 16 is an exploded perspective view of the receptacle. In FIG. 16, like reference numerals refer to like elements in FIGS. 11–15.

In FIG. 16, a receptacle 71 includes a connector housing 72; a composite sleeve (for the optical connector) 73, a light receiving device 4' and a light emitting device 4" which are housed in the housing 72; and a cap 10' put on the connector housing 72. The connector housing 72 has a slit 74 corresponding to a composite sleeve 73. The slit 74 is formed to extend to the receiving cylinders (The remaining configuration of the connector housing 72 is the same as the connector housing 7 (FIG. 1).

The composite sleeve 73 is structured so that a pair of sleeves 61' in parallel are coupled with each other by a coupling portion 76 by resin, molding. Therefore, the connector housing 72 can be assembled by making an insertion operation only once.

The sleeve 61' is different from the sleeve 61 (FIGS. 11 and 12) only in that the projection 69 is canceled. The coupling portion 76 is formed integrally to the edges of guiding portions 63' (may be the flanges 68' thereof) of the pair of sleeves 61' with each other. Namely, the coupling portion 76 can be molded in the two-color molding for the light guiding passage 62'.

The function of the sleeve 61' is of course the same as the sleeve 61.

The optical connector 77 provided with the sleeve 73 can also provide the same effect as that with the other sleeves in the previous embodiments, particularly improves the productivity and transmission efficiency.

What is claimed is:

1. An optical connector comprising a pair of optical fibers, a light receiving module, a light transmitting module, a first sleeve, and a second sleeve, said first sleeve located between the light receiving module and one optical fiber and said second sleeve located between the light transmitting module and the other optical fiber, each sleeve making an optical connection between its respective optical fiber and the light receiving or the light transmitting module, wherein each said sleeve has a light guiding passage which is tapered from each of the optical fibers toward the light receiving or the light transmitting module, thereby forming a conical shape with a sloped side wall and a first end face having a reduced diameter of the light-guiding passage and arranged oppositely to its respective light receiving or light transmitting module, wherein each said sleeve has a guiding portion enlarged in a direction perpendicular to an axis of the light-guiding passage to form a ring shape, said guiding portion being formed on the side of each said optical fibers integrally to said light guiding passage.

2. An optical connector according to claim 1, wherein said guiding portion has a ring-shaped groove formed on the end face opposite to each of the light receiving and the light transmitting modules and successive to the side wall of the light guiding passage.

3. An optical connector according to claim 1, wherein said guiding portion has a cylindrical-hood shape flange extending toward the each said light receiving and transmitting modules and surrounding the light guiding passage.

4. An optical connector according to claim 3, wherein said guiding portion has a projection formed along an extending direction of the flange and integrally thereto.

5. An optical connector comprising a pair of optical fibers, a light receiving module, a light transmitting module, a first sleeve, and a second sleeve, said first sleeve located between the light receiving module and one optical fiber and said second sleeve located between the light transmitting module and the other optical fiber, each sleeve making an optical connection between its respective optical fiber and the light receiving or the light transmitting module, wherein each said sleeve has a light guiding passage which is tapered from each of the optical fibers toward the light receiving or the light transmitting module, thereby forming a conical shape with a sloped side wall and a first end face having a reduced diameter of the light-guiding passage and arranged oppositely to its respective light receiving or light transmitting module, wherein each said sleeves includes a lens integrally formed on its face on the side of the optical fiber, said lens making an optical connection with the optical fiber and being convex toward it.

6. An optical connector according to claim 5, wherein said lens is arranged so that its apex does not protrude from the end face of the guiding portion on the side of each the optical fibers.

7. An optical connector comprising a pair of optical fibers, a light receiving module, a light transmitting module, a first sleeve, and a second sleeve, said first sleeve located between the light receiving module and one optical fiber and said second sleeve located between the light transmitting module and the other optical fiber, each sleeve making an optical connection between its respective optical fiber and the light receiving or the light transmitting module, wherein each said sleeve has a light guiding passage which is tapered from each of the optical fibers toward the light receiving or the light transmitting module, thereby forming a conical shape with a sloped side wall and a first end face having a reduced diameter of the light-guiding passage and arranged oppositely to its respective light receiving or light transmitting module, wherein a second end face of the light-guiding passage opposite to the first end face is served as a light-receiving face of the first sleeve and a light-emitting face of the second sleeve, receiving and emitting, respectively, light propagated through each said optical fibers, said second end face having a larger diameter than an end face of each said optical fibers which serves as a light emitting face or a light receiving face, respectively.

8. An optical connector comprising a pair of optical fibers, a light receiving module, a light transmitting module, a first sleeve, and a second sleeve, said first sleeve located between the light receiving module and one optical fiber and said second sleeve located between the light transmitting module and the other optical fiber, each sleeve making an optical connection between its respective optical fiber and the light receiving or the light transmitting module, wherein each said sleeve has a light guiding passage which is tapered from each of the optical fibers toward the light receiving or the light transmitting module, thereby forming a conical shape with a sloped side wall and a first end face having a reduced diameter of the light-guiding passage and arranged oppositely to its respective light receiving or light transmitting module, wherein said first end face of the light-guiding passage of said second sleeve is served as a light receiving face receiving light to be transmitted from a light emitting face of said light-transmitting module, said first end face having a larger diameter than said light emitting face.

9. An optical connector comprising a pair of optical fibers, a light receiving module, a light transmitting module, a first sleeve, and a second sleeve, said first sleeve located between the light receiving module and one optical fiber and said second sleeve located between the light transmitting module and the other optical fiber, each sleeve making an optical connection between its respective optical fiber and the light receiving or the light transmitting module, wherein each said sleeve has a light guiding passage which is tapered from each of the optical fibers toward the light receiving or the light transmitting module, thereby forming a conical shape with a sloped side wall and a first end face having a reduced diameter of the light-guiding passage and arranged oppositely to its respective light receiving or light transmitting module, wherein said each said sleeves is coated with an anti-reflecting film in its light receiving face.

* * * * *